Dec. 8, 1942.  D. E. TURNBULL  2,304,515
THEFT PREVENTING DEVICE
Filed April 15, 1942
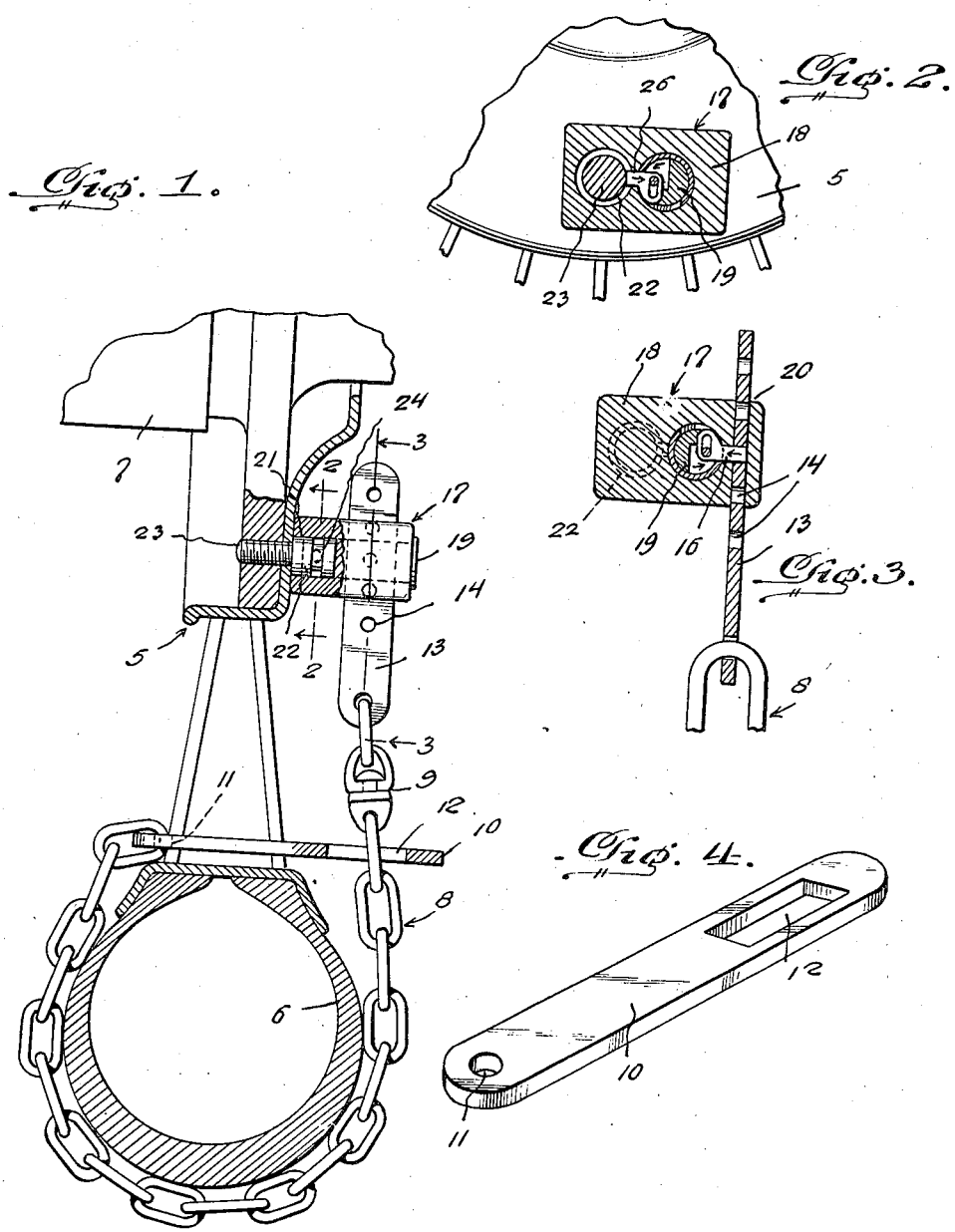
Inventor
Dan E. Turnbull,
By McMorrow & Berman
Attorneys Patented Dec. 8, 1942

2,304,515

UNITED STATES PATENT OFFICE 2,304,515

THEFT PREVENTING DEVICE

Dan E. Turnbull, South Fork, Colo.

Application April 15, 1942, Serial No. 439,121

1 Claim. (Cl. 70—259)

This invention relates to theft preventing devices especially adapted to prevent tires and wheels of motor vehicles from being stolen when said vehicles are left unattended.

The primary object of this invention is the provision of a device which may be easily and quickly installed and will act to prevent unauthorized removal of a motor vehicle wheel or the tire thereof, also the application of said device in no way will require change or modification in any respect to the motor vehicle or its wheel as now constructed and used.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary transverse sectional view illustrating a portion of a motor vehicle wheel and its tire with an anti-theft device applied thereto and constructed in accordance with my invention.

Figure 2 is a sectional view taken on the line 2—2 of Figure 1.

Figure 3 is a sectional view taken on the line 3—3 of Figure 1.

Figure 4 is a perspective view illustrating a plate applicable to one end of a flexible restraining element for permitting a portion of said element to be arranged in loop formation surrounding the tire and rim of the wheel.

Referring in detail to the drawing, the numeral 5 indicates a portion of a conventional type of motor vehicle wheel and 6 the tire thereof. To remove the tire it is only necessary that the tire be deflated and pried off of the rim of the wheel. Also the wheel is removable from the hub axle 7 of the motor vehicle by the removal of stud bolts. Consequently it is a very simple matter for a thief to remove either the tire or wheel from a motor vehicle when left unattended.

To eliminate theft of the tire or wheel, the present invention may be employed as shown in Figure 1 which will prevent the removal of the tire from the wheel or the wheel from the hub axle.

In the construction of this invention, a flexible element 8 is employed which may be in the form of a chain, as shown in Figure 1, or if desired, may be a flexible metallic cable. The flexible element 8 includes a swivel 9 to assist in preventing tangling of the flexible element.

A plate 10 of elongated formation is provided in one end thereof with an aperture 11 to permit one end of the flexible element to be connected thereto. The plate 10 adjacent its other end is provided with an elongated slot 12 through which the flexible element may pass. The other end of the flexible element has connected thereto an elongated lock plate 13 provided with spaced openings 14 to receive a latch element 16 of a lock 17.

The housing or body of the lock 17 is indicated by the character 18 and is chambered to receive a key operated lock barrel 19 and also is provided with a slot 20 to receive the lock plate 13 and a recess 21 to removably receive a head 22 of a stud bolt 23. The stud bolt 23 is employed in lieu of one of the usual stud bolts employed for removably securing the wheel 5 on the hub axle 7. The head 22 has an annular groove 24 in which may enter a latch element 26 to prevent the unauthorized removal of the lock housing or body from the head of the stud bolt, still permitting the body or housing to rotate thereon which will prevent a person from employing the lock housing or body in unthreading the stud bolt 23 from the axle hub 7.

The lock barrel 19 of the lock 17 is more or less of conventional construction. However, in this instance it is provided with notches or slots in which operate the latch elements 16 and 26. Said latch elements have pivotal and slidable connection with the key operated lock barrel within the slots thereof so that on rotation of the key barrel in one direction, the latch elements will be extended and on the rotation of the latch barrel in a reverse direction said latch elements will be retracted. The latch element 16 is adapted to enter any one of the openings 14 in the lock plate 13 when the latter has been positioned in the slot 20.

To adapt the invention to the wheel and its tire, the flexible element is placed about the tire as shown in Figure 1 of the drawing with the plate 10 extending between spokes of the wheel and with the flexible element extending through the slot 12 of said plate. The plate 13, after the application of the lock 17 to the stud bolt 23, is inserted in the slot 20 and the key barrel operated to extend the latch elements, one of which enters one of the openings 14 of the lock plate and the other the groove in the head of the stud bolt. After the removal of the usual key and on completion of the foregoing described operation, the wheel cannot then be removed from the hub axle nor the tire from the rim of the wheel.

It is to be understood that in the use of the present invention, each wheel of the motor vehicle will be equipped with the present invention when left unattended so that none of the wheels or tires of the vehicle can be stolen when said vehicle is left unattended. Also, it will be seen from the disclosure made in Figure 1 and the foreging description that the present invention is simple to remove from the wheel and the tire and may be conveniently stored in a comparatively small space within the vehicle.

While I have shown and described the preferred embodiment of my invention, it will be understood that minor changes in construction, combination and arrangement of parts may be made without departing from the spirit and scope of the invention as claimed.

Having thus described my invention, what I claim is:

In an anti-theft device, a lock including a body and a key operated locking means therein, a stud bolt rotatably and detachably secured in the body by said locking means and adapted to be employed in lieu of one of the securing bolts of a motor vehicle wheel, a flexible element, a plate secured to one end of the element and provided with a slot, said element adapted to be arranged about a tire on the wheel with the plate attached thereto positioned through the wheel and the flexible element extending through the slot, and a lock plate secured to the other end of the flexible element and detachably secured to the stud bolt by the locking means engaging therewith.

DAN E. TURNBULL.